United States Patent
Jackway et al.

(10) Patent No.: US 6,882,748 B2
(45) Date of Patent: Apr. 19, 2005

(54) METHOD FOR IMAGE TEXTURE ANALYSIS

(75) Inventors: Paul Jackway, Toowong (AU); Damian Jones, Hatfield, PA (US)

(73) Assignees: University of Adelaide, Adelaide (AU); RLM Systems Pty. Ltd., Burwood East (AU); Commonwealth of Australia, Salisbury (AU); University of Melbourne, Parkville (AU); University of Queensland, St. Lucia (AU); Compaq Computer Australia Pty. Ltd., Adelaide (AU); CEA Technologies, Inc., Fyshwick (AU); University of South Australia, Adelaide (AU); Finders University, Bedford Park (AU); Telstra Corporation Limited, Clayton (AU)

( * ) Notice: Subject to any disclaimer, the term of this patent is extended or adjusted under 35 U.S.C. 154(b) by 614 days.

(21) Appl. No.: 09/944,838

(22) Filed: Aug. 31, 2001

(65) Prior Publication Data

US 2002/0051571 A1 May 2, 2002

(30) Foreign Application Priority Data

Mar. 2, 1999 (AU) .............................................. PP8984

(51) Int. Cl.[7] .............................. G06K 9/66; G06K 9/36; G09G 5/00
(52) U.S. Cl. ....................... 382/190; 382/195; 382/276; 382/286; 345/582; 345/583
(58) Field of Search ................................ 382/382, 108, 382/145, 147, 149, 190, 195, 257, 270, 276, 286, 308; 345/582–588

(56) References Cited

U.S. PATENT DOCUMENTS

| | | | |
|---|---|---|---|
| 5,426,684 A | | 6/1995 | Gaborski et al. |
| 5,680,475 A | | 10/1997 | Zwierski et al. |
| 5,832,118 A | | 11/1998 | Kim |
| 5,848,198 A | * | 12/1998 | Penn ........................... 382/276 |
| 6,038,342 A | * | 3/2000 | Bernzott et al. ............. 382/173 |
| 6,052,126 A | * | 4/2000 | Sakuraba et al. ........... 345/582 |
| 6,285,373 B1 | * | 9/2001 | Baldwin et al. ............. 345/582 |
| 6,333,747 B1 | * | 12/2001 | Murata et al. .............. 345/582 |
| 6,636,635 B1 | * | 10/2003 | Matsugu ...................... 382/218 |

FOREIGN PATENT DOCUMENTS

AU    A-38395/97    9/1998

* cited by examiner

Primary Examiner—Samir Ahmed
Assistant Examiner—Brian Le
(74) Attorney, Agent, or Firm—Buckingham, Doolittle & Burroughs, LLP; Louis F. Wagner

(57) ABSTRACT

A method and apparatus for image texture analysis in which the image is mapped into a first set of binary representation by a monotonically varying operator, such as a threshold operator. Each binary representation in the first set of binary representations is mapped to a further set of binary representations using a second monotonically varying operator, such as a spatial operator. The result of the two mappings is a matrix of binary image representations. Each binary image representation is allocated a scalar value to form an array of scalar values which may be analysed to identify defined texture characteristics.

12 Claims, 8 Drawing Sheets

| $\delta(\Psi_{j_1}\Phi_{i_1}(X))$ | $\delta(\Psi_{j_2}\Phi_{i_1}(X))$ | ... | ... | $\delta(\Psi_{j_{max}}\Phi_{i_1}(X))$ |
|---|---|---|---|---|
| $\delta(\Psi_{j_1}\Phi_{i_2}(X))$ | $\delta(\Psi_{j_2}\Phi_{i_2}(X))$ | ... | ... | $\delta(\Psi_{j_{max}}\Phi_{i_2}(X))$ |
| ⋮ | ⋮ | | | ⋮ |
| ⋮ | ⋮ | | | ⋮ |
| $\delta(\Psi_{j_1}\Phi_{i_{max}}(X))$ | $\delta(\Psi_{j_2}\Phi_{i_{max}}(X))$ | ... | ... | $\delta(\Psi_{j_{max}}\Phi_{i_{max}}(X))$ | j increasing → i increasing ↓

(a)

(b)

(c)

(d)

METHOD FOR IMAGE TEXTURE ANALYSIS

FIELD OF THE INVENTION

The invention relates to a computer-implemented method of analysing image texture. In particular, it provides a method of applying selected mappings to an image to generate a surface that may be analysed to characterise the texture of the image.

BACKGROUND TO THE INVENTION

Image texture is a useful characteristic for object differentiation. However, image texture is a difficult characteristic to describe without using some kind of comparison to already familiar objects. Thus, human analysis of image texture is highly subjective. A computer based texture analysis method has the potential to provide a quantitative, and therefore more useful, measure of texture.

Once a textured object is in digital form the problem of analysis becomes a mathematical problem rather than the verbal problem of description. The mathematical problem has proven to be no less intractable.

The problem of image analysis has traditionally been approached as an analysis of visual images or pictures of macroscopic objects, such as crops or forests, or microscopic objects such as stained tissues or cells. However, the principles of texture analysis are applicable to any image be it visual, acoustic or otherwise. Image texture can be qualitatively evaluated as having one or more of the properties of fineness, coarseness, smoothness, granulation, randomness, lineation or being mottled, irregular or hummocky. These are relative terms, a useful analysis of the characteristics of an image must include an absolute measurement of image properties.

In general terms, the approaches to texture analysis can be divided into three primary techniques, these are: statistical, structural and spectral. Statistical techniques include first order approaches such as autocorrelation functions and higher order approaches such as gray-tone spatial-dependence matrices (see Haralick, Shanmugan & Dinstein; "Textural features for image classification", IEEE Transactions on Systems, Man and Cybernetics SMC-3(6), 610–621; 1973). Structural techniques include the use of primitives and spatial relationships (see Haralick; "Statistical and structural approaches to texture", Proceedings of the IEEE 67(5), 786–804; 1979). The main spectral technique is Fourier analysis.

There are five steps in image processing. These steps are image acquisition, preprocessing, segmentation, representation and description, and recognition and interpretation. The invention falls into the step of representation and description. Persons skilled in the art will be aware of existing techniques for performing the remaining four steps of image processing.

A general explanation of the prior art relevant to texture analysis can be found in Chapter 9 of "Vision in Man and Machine" by Levine, M; McGraw-Hill, Kew York (1985). Despite research in the area of texture analysis no single method has been developed that completely describes texture either verbally or mathematically.

Abdel-Mottaleb makes mention of texture analysis in U.S. Pat. No. 5,768,333, as a technique for second stage discrimination of objects. While, Abdel-Mottaleb makes use of a large number of gray level thresholds, image texture is then characterised by computing many features of each connected component in the resulting threshold separately, no 2-dimensional surface is formed.

OBJECT OF THE INVENTION

It is an object of the present invention to provide a method of image texture analysis to usefully describe observed image texture.

Further objects will be evident from the following description.

DISCLOSURE OF THE INVENTION

In one form, although it need not be the only or indeed the broadest form, the invention resides in a method of analysing the texture of an image, including the steps of:

mapping the image into a first set of binary representations of the image, wherein each representation in the set corresponds to a transformation by a first monotonically varying operator;

mapping each binary representation of the first set of binary representations into a further set of binary image representations using a second monotonically varying operator, thereby forming a matrix of binary image representations;

transforming the matrix by allocating a scalar value to each binary image representation;

arranging the scalar values in a two dimensional space against parameters of the first monotonically varying operator and the second monotonically varying operator to form a first array of scalar values; and identifying defined texture characteristics from the resulting first array of scalar values.

By monotonic operator is meant an operator acting on an image, the result of which only decreases (never increases), with an increase in its parameter, or with a decrease in its argument.

In preference, the first monotonically varying operator is a threshold operator wherein the threshold operator applies a threshold value that varies monotonically from a minimum value to a maximum value to produce the first set of binary representations.

In preference, the second monotonically varying operator is a spatial operator wherein the spatial operator applies an opening that varies monotonically from a minimum value to a maximum value to produce the further set of binary representations. Suitably, the second monotonically varying operator is a morphological opening that removes all image objects below a defined size.

The method may include the further step of calculating a second array of scalar values derived from the first array of scalar values by taking at each point the minimum of the first difference in a first direction and the first difference in a second direction.

The step of identifying defined texture characteristics may include the further step of comparing the first or second array of scalar values to a knowledge base of first or second array values known to indicate defined texture characteristics.

The method may include the further step of calculating one or several texture feature values by computing linear sums of the values in the first or second arrays of scalar values. In preference, the coefficients of these linear sums are determined by a principal components analysis on the data.

In a further form, the invention resides in an image analysis apparatus comprising:

storage means for storing a digital representation of an image;

processing means for:

mapping the image into a first set of binary representations of the image, wherein each representation in the set corresponds to a transformation by a first monotonically varying operator;

mapping each binary representation of the first set of binary representations into a further set of binary image representations using a second monotonically varying operator, thereby forming a matrix of binary image representations; transforming the matrix by allocating a scalar value to each binary image representation;

plotting the scalar values in a two dimensional space against parameters of the first monotonically varying operator and the second monotonically varying operator to form a first array of scalar values; and identifying defined texture characteristics from the resulting first array of scalar values; and display means for displaying the first array of scalar values and identified texture characteristics.

BRIEF DETAILS OF THE DRAWINGS

To assist in understanding the invention preferred embodiments will now be described with reference to the following figures in which.

Figures 2, 3:
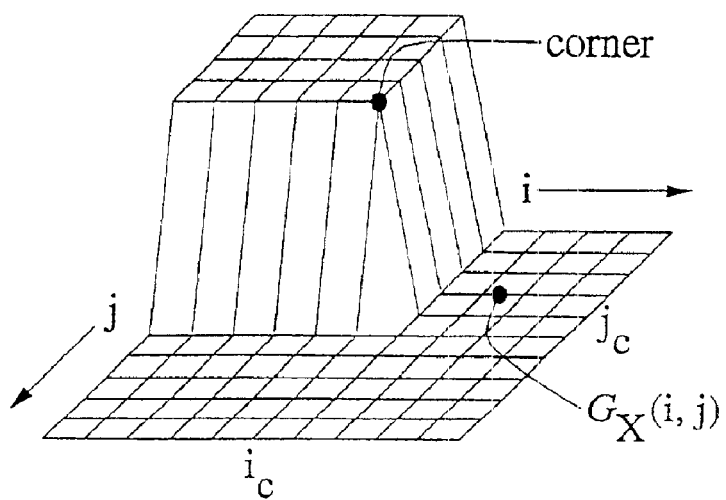
FIG. 2 shows the array of values of the granold surface.
Figure 4:
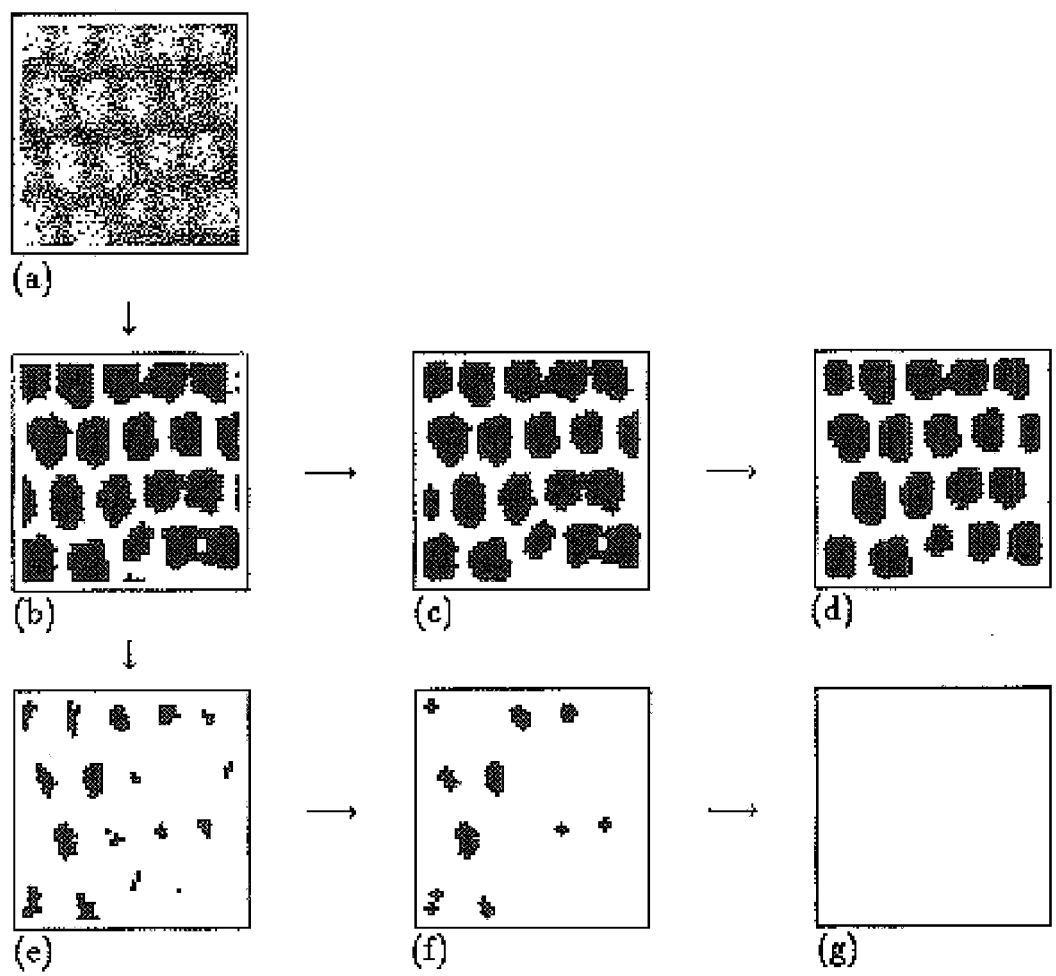
Figure 5A:
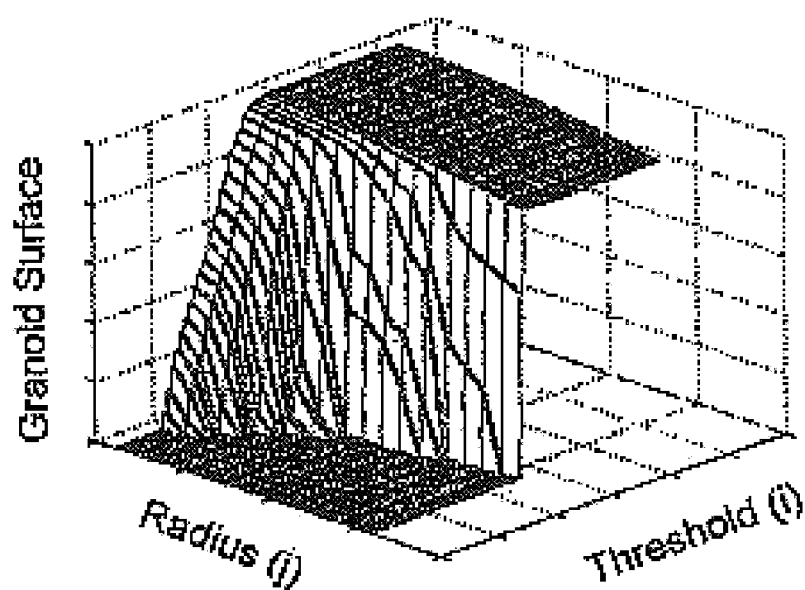
Figure 5B:
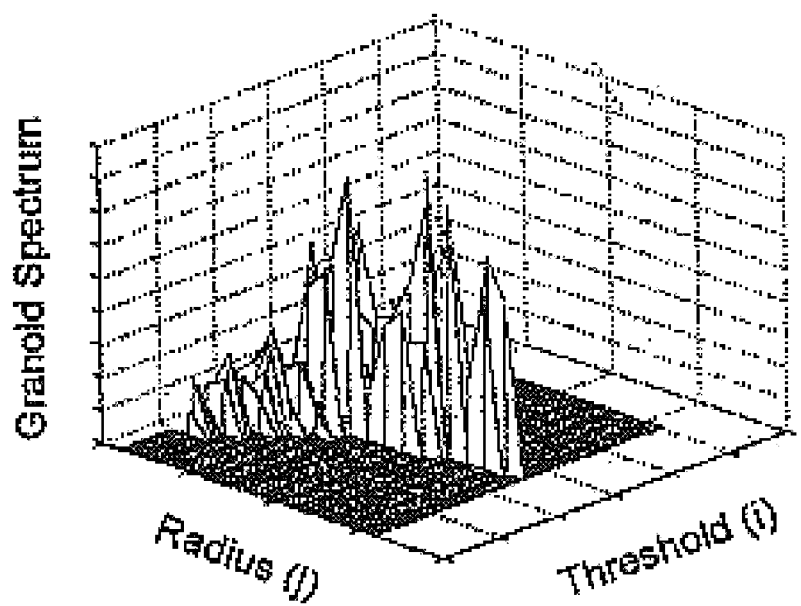
Figure 8:
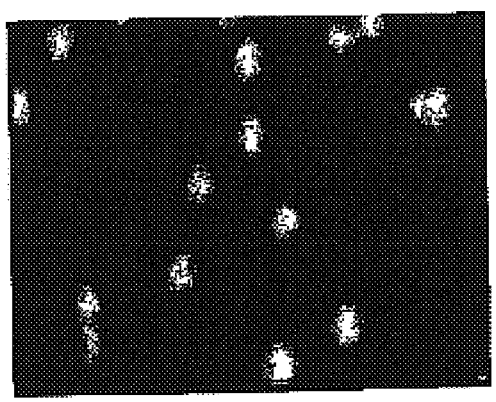
Figure 8:
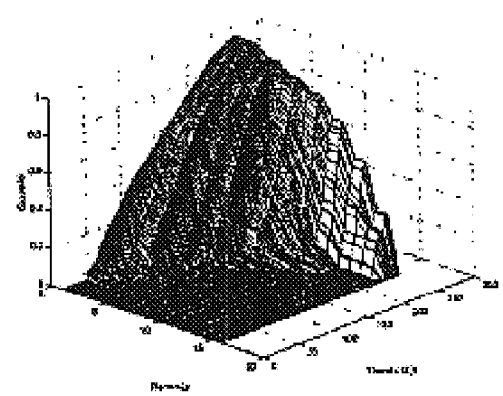
Figure 8:
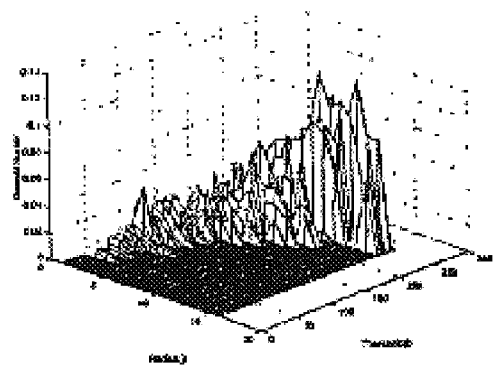
Figure 8:
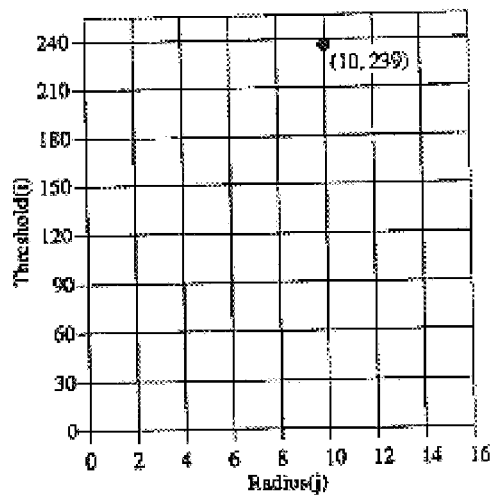
Figure 9:
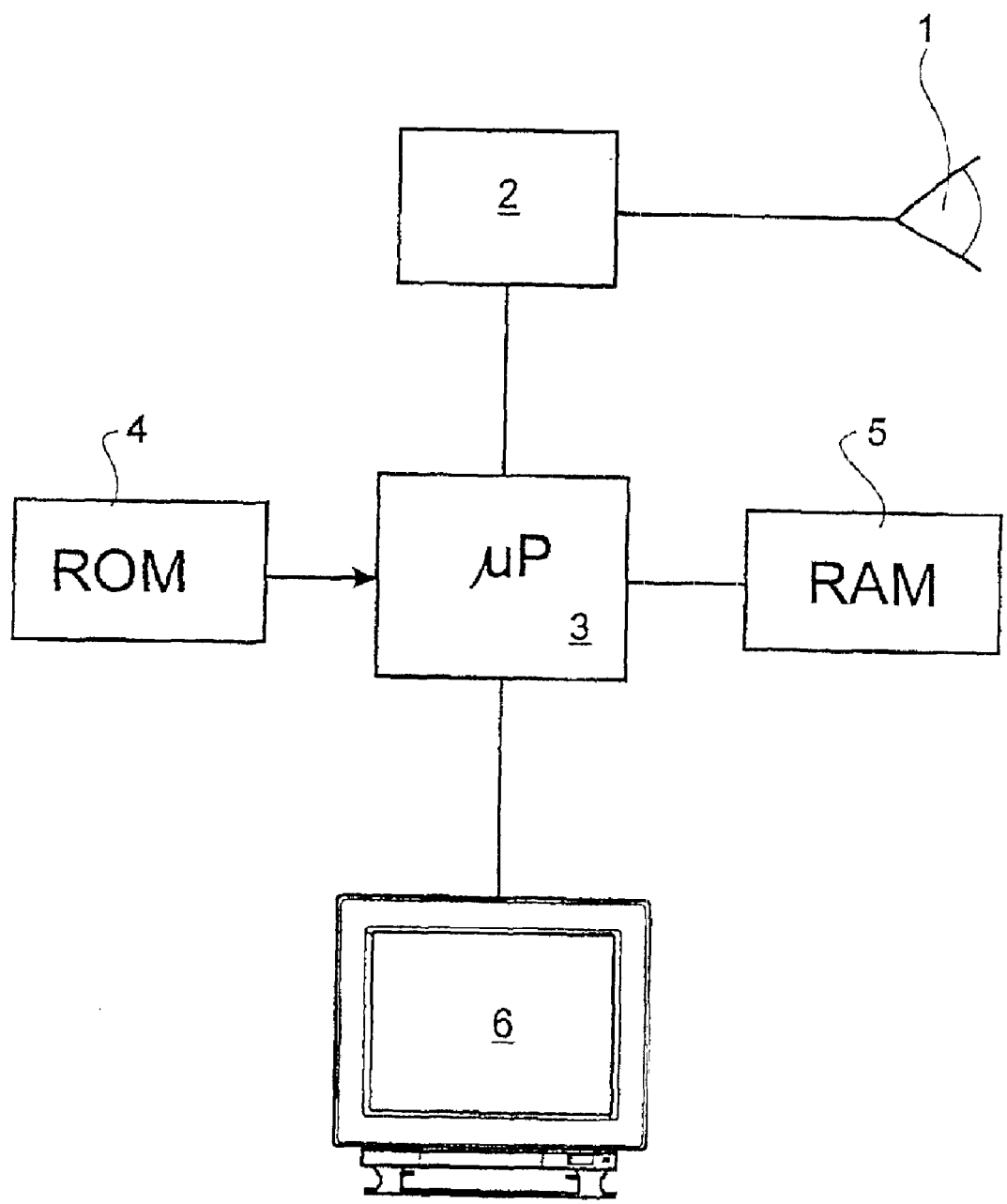

FIG. 3 displays a granold surface;

FIG. 4 shows an example of the application of the method to an image;

FIG. 4a shows a 50×50 pixel gray level image;

FIG. 4b is a binary image produced by thresholding the image of FIG. 4a;

FIG. 4c is the image produced by opening the image of FIG. 4b with a disc shaped structuring element of radius 1;

FIG. 4d is the image produced by opening the image of FIG. 4c with a disc shaped structuring element of radius 2;

FIG. 4e is a binary image produced by thresholding the image of FIG. 4a using a different threshold from that used to produce the image of FIG. 4b;

FIG. 4f is the image produced by opening the image of FIG. 4e with a disc shaped structuring element of radius 1;

FIG. 4g is the image produced by opening the image of FIG. 4f with a disc shaped structuring element of radius 2;

FIG. 5a shows the granold surface derived from the example of FIG. 4;

FIG. 5b shows the granold spectrum derived from the granold surface of FIG. 5a;

FIG. 6a shows a gray level image in a first example of the application of the method to the characterisation of ammonium sulphate pellets;

FIG. 6b is a plot of a granold surface produced by thresholding the image of FIG. 6a;

FIG. 6c is a granold spectrum corresponding to the granold surface of FIG. 6b;

FIG. 6d is a threshold/radius location of the maximum value of the granold surface of FIG. 6b;

FIG. 7a shows a gray level image in a second example of the application of the method to the characterisation of ammonium sulphate pellets;

FIG. 7b is a plot of a granold surface produced by thresholding the image of FIG. 7a;

FIG. 7c is a granold spectrum corresponding to the granold surface of FIG. 7b;

FIG. 7d is a threshold/radius location of the maximum value of the granold surface of FIG. 7b;

FIG. 8a shows a gray level image in a third example of the application of the method to the characterisation of ammonium sulphate pellets;

FIG. 8b is a plot of a granold surface produced by thresholding the image of FIG. 8a;

FIG. 8c is a granold spectrum corresponding to the granold surface of FIG. 8b;

FIG. 8d is a threshold/radius location of the maximum value of the granold surface of FIG. 8b; and FIG. 9 is a block diagram of an apparatus for working the invention.

DETAILED DESCRIPTION OF THE DRAWINGS

Figure 1:
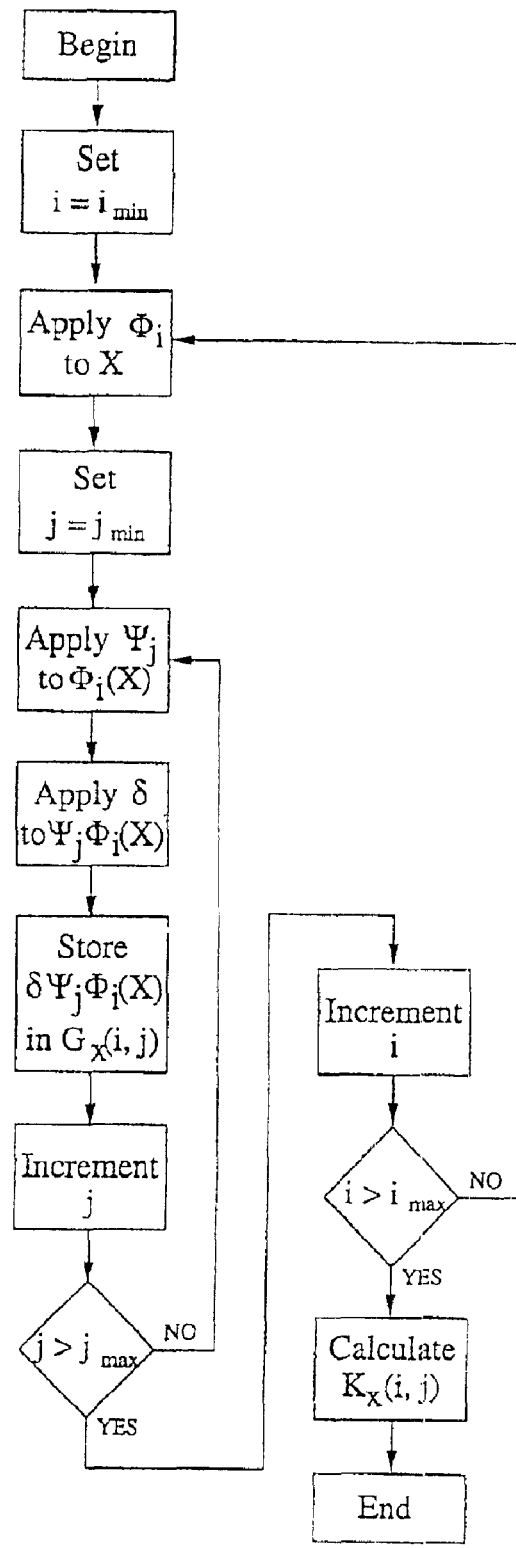
FIG. 1 is a flow chart showing the method of image texture analysis.

In the drawings, like reference numerals refer to like parts. Referring to FIG. 1, the flow diagram indicates the steps of a method of texture analysis. The method is preferably implemented in a computer, persons skilled in programming will be able to readily produce appropriate code in a suitable language to implement the method.

The flow diagram is directed to the situation in which the monotonic mappings are gray level thresholding and spatial opening. The example is two-dimensional but the method is applicable to multi-dimensional applications. A mathematical description is presented later which generalises the specific example to a wider range of situations.

In the flow diagram, the gray level image to be analysed is designated as X. A threshold operator $\Phi_i$ is applied at a first value of $I=i_{min}$. Typically, an 8-bit gray level image might first be thresholded at gray level 0. A binary image $\Phi_i(X)$ is obtained by this thresholding operation where pixels having a gray level above the threshold will have a value of one and all other pixels have a value of zero. Applying spatial operator $\Psi_j$ then morphologically opens the binary image.

In the example described here, a set of disc shaped structuring elements of increasing radius is used as the morphological opening. Thus, the smallest value of $j=j_{min}$ corresponds to the first member in the set, which has the smallest radius. All pixel clusters having a radius less than j are set to zero and the rest are retained. The remaining area of the resulting binary image $\Psi_j\Phi_i(X)$ is then calculated (for example, by counting all pixels having a value of one) to give a value $\delta\Psi_j\Phi_i(X)$. This value is stored in a two-dimensional array $G_x$ in a position corresponding to the $i^{th}$ threshold operator versus the $j^{th}$ spatial operator.

The value of j is iterated and the next spatial operator $\Psi_{j+1}$ is applied to $\Phi_i(X)$ and the value $\delta\Psi_{j+1}\Phi_i(X)$ is calculated and stored in the array at location $G_x(i,j+1)$. The iteration and application of the spatial operator continues until $j=j_{max}$. The value of $j_{max}$ may be arbitrarily chosen or may be the value of j such that $\delta\Psi_{jmax}\Phi_i(X)=0$. This process of continually opening a binary image with a suitable set of structuring elements and measuring the remaining area produces a morphological granulometry of the binary image.

Once the granulometry of the first binary image has been completed the original gray level image is thresholded for the next value of I. The morphological granulometry for the $I+1^{th}$ binary image is then formed and entered into the granold surface array. The process is repeated, as shown in FIG. 1, until $I=i_{max}$. The value for I may be chosen arbitrarily or may be the value of the highest gray level threshold possible in the image. For an 8-bit gray level image this would be 255.

The resultant array is represented in FIG. 2 and is referred to as the topographical granold surface. The array has $(i_{max}-i_{min}) \times (j_{max}-j_{min})$ elements that can be plotted as a surface in the manner shown in FIG. 3. Corners appear on the surface that indicate a relationship between size and gray level of granules in the original image. An idealised corner is shown in the surface $G_x(i,j)$ of FIG. 3 at a position corresponding to $I=i_c$ and $j=j_c$. Further processing, for example by taking at each point the minimum of the first difference in the I direction and the first difference in the j direction of the granold surface, can be performed to form the granold spectrum (also called the granold korner surface). As shown in the following figures, further processing can result in a spectral-like result that simultaneously reveals the distribution of size and gray level of granules within the original image.

FIG. 4 shows an example of a number of images produced by the method described above, FIG. 4a shows a 50×50 pixel gray level image. FIG. 4b is a binary image produced by thresholding the image of FIG. 4a at a threshold level of 172. The image of FIG. 4b is opened with a disc shaped structuring element of radius 1 to produce the image of FIG. 4c. The image of FIG. 4c is opened with a disc shaped structuring element of radius 2 to produce the image of FIG. 4d. This process is continued with increasing radius until the remaining image is reduced to zero. The original image is thresholded at a gray level of 209 to produce the binary image of FIG. 4e. Disc shaped structuring elements of radius 1 and 2 are used to produce the images of FIG. 4f and FIG. 4g respectively.

FIG. 4 clearly demonstrates that the number of remaining pixels decreases with increasing threshold and increasing radius of the spatial operator. The actual values of the granold surface calculated for each image are $G_x(172,1)=1296$, $G_x(172,2)=1210$, $G_x(209,1)=133$ and $G_x(209,2)=0$.

The complete granold surface $G_x(i,j)$ for the image of FIG. 4a is displayed in FIG. 5a. The surface was constructed using a threshold operator that applied gray level thresholds from 0 to 255 and a spatial operator that applied a set of disc shaped structuring elements with radii from 1 to 16. The plot has been normalised to the original image area of 2500 pixels. The corresponding granold spectrum $K_x(i,j)$ is shown in FIG. 5b. The granold spectrum provides a spectral-like plot that characterises the original image in a reproducible and objective manner.

EXAMPLE

Characterisation of matter by pellet size and colour intensity may be applicable to a variety of industries, such as confectionery, pharmaceuticals and fertilisers, for quality control. FIG's 6–8 provide an example of the application of the invention to the characterisation of ammonium sulphate pellets.

Figure 6:
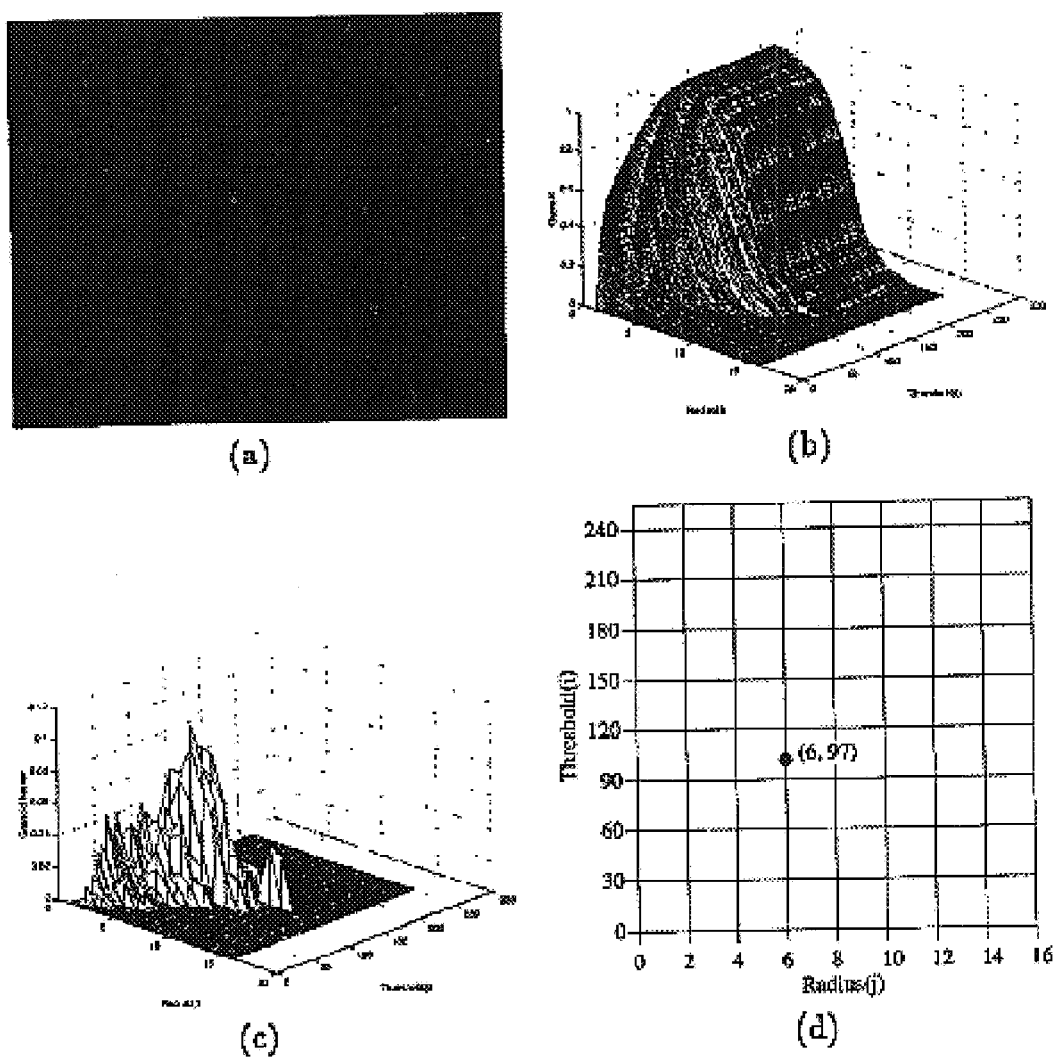
Figure 7:
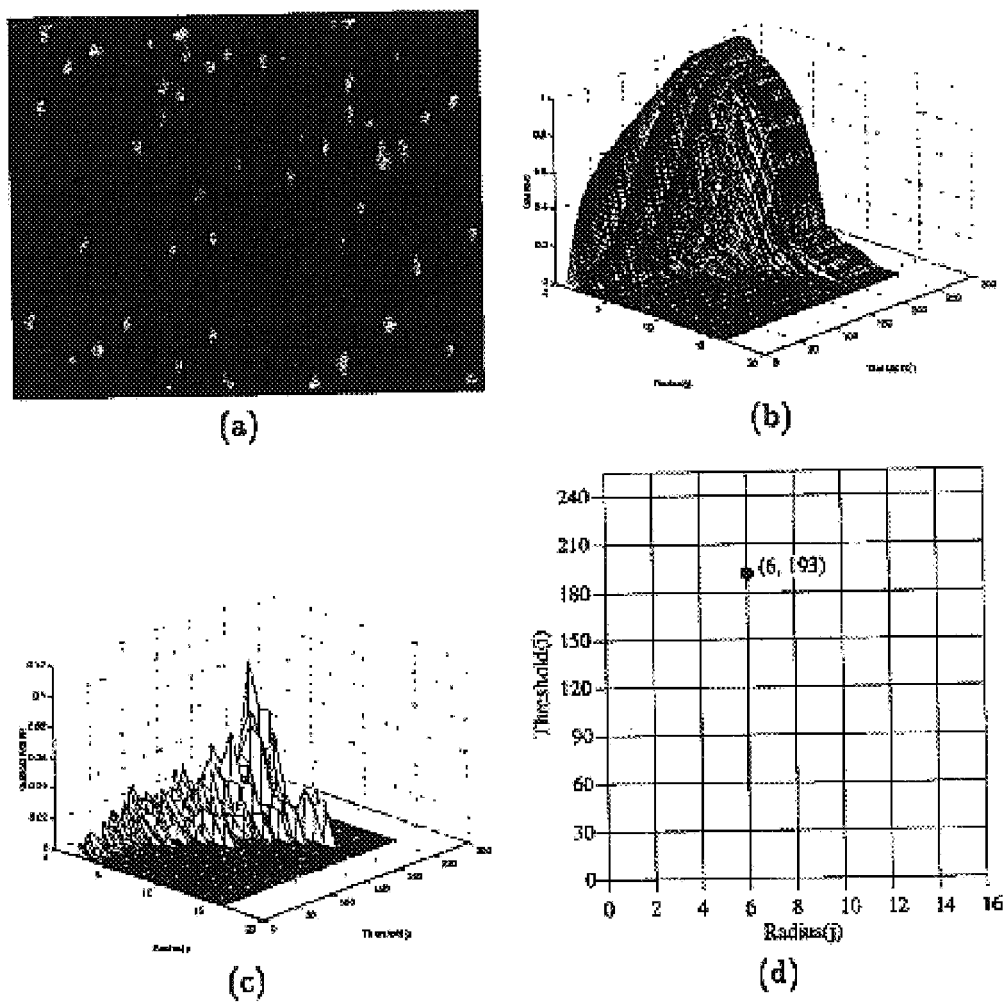

In each of FIG's 6–8, image (a) is a gray level image produced by a video camera and frame grabber as ammonium sulphate pellets fall from a drum granulator in a fertiliser plant. The pellets of FIG. 6 and FIG. 7 are the same size but the pellets of FIG. 8 are larger. Green food dye was added to the pellets to provide colour variation with FIG. 6 being the darkest and FIG. 8 being the lightest.

Image (b) of each figure is a plot of the granold surface produced by applying a threshold operator that applied gray level thresholds from 0 to 255 and a spatial operator that applied a set of 16 disc shaped structuring elements. Image (c) is the corresponding granold spectrum.

Further processing of the granold spectrum involved identifying the threshold/radius location of the maximum value of the surface. The value indicates the gray level and size of the majority of the pellets in the image. It will be appreciated that statistical analysis of the granold spectrum can characterise the pellets by the mean and standard deviation of the size and colour of the pellets. Such an analysis provides a useful standard for quality control.

It will be appreciated that the foregoing examples are limited to two-dimensional space but can be generalised to multi-dimensional images to produce a similar granold surface and granold spectrum. Furthermore, the operators that produce the mappings are not limited to threshold, opening size and area. Other suitable operators may include contrast dynamic, attribute opening, etc.

The following generalised description is presented mathematically in a manner that will be understood by those skilled in the relevant art.

MATHEMATICAL DESCRIPTION

In order to describe the method it is necessary to define certain notations.

In the following, "$R^+$" denotes the non-negative real numbers (including zero), "Z" the integers $\{\ldots, -1,0,1, \ldots\}$ and "N" the natural numbers $\{0,1,2,\ldots\}$.

We define $$\{F\}:Z^n \to Z^n \quad (1)$$

Here {F} represents the general class of m-integer valued functions on n-dimensional space. We would typically use such a function to represent a gray scale 2-D image, in which case we would write, for example, "let $X \in F$ be a 2-D gray scale image . . . ". This statement implies that n=2 and m=1. We keep the dimensions of the image representation general (at n and m) so as not to unnecessarily limit the scope of the method to 2-D images. The domain of the image $X \in F$ will be denoted by Dom(X). The domain is the set of al points in $Z^n$ for which X is defined.

Next we define, $$B \in P(Z^n) \quad (2)$$

Where P is the powerset operator, so $P(Z^n)$ is the set of all subsets of $Z^n$. B represents the general class of binary images on n-dimensional integer space. We would typically use such a notation to represent a 2-D binary image where we would write, "let be a 2-D binary image . . . ". which statement implies that n+2. Again, we keep the dimensions of the image general at n so as not to unnecessarily limit the scope of the method to 2-D images. The domain of the binary image $B \in B$ will be denoted Dom(B).

Based on the image spaces defined above we now define the mappings or operators used to form the granold surface. Firstly, we define, $$\Phi: F \to B \quad (3)$$

This function to set mapping takes a gray scale image and returns a binary image. As an example let $X \in F$ be a 2-D gray scale image, so we could write, $B=\Phi(X)$. The resulting image $B \in B$ is a 2-D binary image.

The thresholding of regions based on region minima or maxima values, the thresholding of regions based on contrast dynamic values, and the gray level threshold operation, well known in image processing, are all examples of this type of mapping.

Secondly we define, $$\Psi: B \to B \quad (4)$$

This set to set mapping, which we will call an "operator", takes a binary image and returns a binary image. As an example, let B∈B be a 2-D binary image so we could write, A=Ψ(B). The resulting image A∈B is also a 2-D binary image.

The binary AND operation, the attribute opening operation, and the morphological binary opening operation, also well known in image processing, are all examples of this type of mapping.

It is the intention that these mappings preserve the domain or support of the images in all cases, that is, $$Dom(\Phi(X))=Dom(X) \quad (5)$$

and $$Dom(\Psi(B))=Dom(B) \quad (6)$$

and with the composition of these mappings'

$$Dom(\Psi\Phi(X))=Dom(X) \quad (7)$$

Lastly, we define the set measure, $$\delta: B \to R^+ \quad (8)$$

This set to scalar mapping, which we will call a "measure", takes a binary image and returns a non-negative scalar value. The area (number of object pixels) of a binary image is an example of this type of mapping, so we could write, for example, area=δ(B).

The next step is to parameterise the mappings Φ and Ψ to give families of mappings and operators indexed on non-negative integer parameters i∈N. Therefore we have families, $$\{\Phi_i\}: F \to B \quad (9)$$

and, $$\{\Psi_i\}: B \to B \quad (10)$$

It is important for the method that the above mappings posses additional mathematical properties as follows:

Property 1—Monotone Decreasing for Parameter

The families of mappings $\Phi_i$ and $\Psi_i$ must be "monotone decreasing" with respect to their parameter I. Also, to ensure that (in the limit) the mappings extract all the information from the images, there should exist values M and N (which may depend on the images) such that for i>M and i>N respectively, the appropriate mappings produce the empty-set, Ø. In contrast, we should also ensure that the index zero mappings have the least possible effect on the image and respectively produce the domain of the image or reproduces the image itself.

In mathematical terms, for the mappings $\Phi_i$ and for any X∈F, $$i = 0 \Rightarrow \Phi_i(X) = Dom(X) \quad (11)$$

$$0 < i < j < M \Rightarrow \Phi_j(X) \subseteq \Phi_i(X) \quad (12)$$

$$i \geq M \Rightarrow \Phi_i(X) = \emptyset \quad (13)$$

Likewise, for the operators $\Psi_i$ and for any A∈B, $$i = 0 \Rightarrow \Psi_i(A) = A \quad (14)$$

$$0 < i < j < N \Rightarrow \Psi_j(A) \subseteq \Psi_i(A) \quad (15)$$

$$i \geq N \Rightarrow \Psi_i(A) = \emptyset \quad (16)$$

Property 2—Monotone Increasing for Argument

The families of operators (set to set mappings) $\Psi_i$ need to have some additional properties to ensure the granold surface is well behaved. Firstly, $\Psi_i$ needs to be "anti-extensive" and to remove detail from the binary image B∈B, that is, for all i∈N $$\Psi_i(B)=B \quad (17)$$

Secondly, the operators $\Psi_i$ must be "monotone increasing" with respect to their arguments, the binary images, that is for the binary images A, B∈B for a fixed integer i∈N $$A \subset B \Rightarrow \Psi_i(A) \subseteq \Psi_i(B) \quad (18)$$

Property 3—Measurement

Finally, the measure δ, to represent the usual sense of measuring something, must be: (I) zero if the object to be measured is empty, $$\delta(\emptyset)=0 \quad (19)$$

and (ii) increasing, that is, $$A \subset B \Rightarrow \delta(A) \leq \delta(B) \quad (20)$$

Now we consider the composition of these mappings as follows'

$$(\delta\Psi_j\Phi_i): F \to R^+ \quad (21)$$

This function to scalar mapping, which we have previously termed a "granold" (granulometry of threshold), takes a gray scale image and returns a non-negative scalar which depends on the values of the parameters I and j (and of course the image itself).

To show the dependence on I and j explicitly, vie choose to denote the granold $G_x(i,j): N^2 \to R^+$ of an image X∈F as a 2-D function, $$G_x(i,j) \stackrel{def}{=} (\delta\Psi_j\Phi_i)(X) \quad (22)$$

If G is represented as a function on two dimensions or a surface then regions I and j both have a large effect on the value of δ will appear as "corners" in the surface. The location and "sharpness" of these corners will reveal the particular values of I and j that have a large effect on the value of δ.

The following first differences are useful for analysing G. These differences approximate the directional derivatives of the granold and will be large wherever there is a rapid fall in the granold in the corresponding directions.

$$\Delta_X^x(i,j) \stackrel{def}{=} G_X(i,j) - G_X(i+1,j) \quad (23)$$

$$\Delta_X^y(i,j) \stackrel{def}{=} D_X(i,j) - G_X(i,j+1) \quad (24)$$

The quantity, $$K_X(i, j) \stackrel{def}{=} \min(\Delta_X^x(i, j), \Delta_X^y(i, j)) \quad (25)$$

is useful to determine where the granold surface has simultaneous large first differences in both the $\Phi_i$ and $\Psi_i$ directions, and produces the granold spectrum.

To classify textures we may compute the texture features, $$S_k = \sum_{ij} \alpha_{kij} G_X(i, j) \text{ and/or,} \quad (26)$$

$$T_k = \sum_{ij} \beta_{kij} K_X(i, j) \quad (27)$$

where the coefficients, $\alpha_{kij}$ and $\beta_{kij}$ and would be found by, for example, principal components analysis of the data.

A suitable apparatus for putting the invention into effect is shown in FIG. 9. An image is acquired with acquisition means 1. This could be a digital camera or digitizer that converts an analogue signal. Pre-processing may occur at 2. This may be on-board processing in the acquisition means 1, or may be, for example, post-acquisition filtering.

Signals are passed to a processor 3 that is programmed to work the method described above. Required parameters may be stored in ROM 4 and temporary storage is provided by RAM 5. The result of the image texture analysis is displayed on monitor 6. Other data storage means such as disk or tape (not shown) may also be connected to the processor 3. The data storage may store a knowledge database of previous image texture analyses that can be used to identify texture characteristics by comparison.

Persons skilled in the relevant art will appreciate that the method of image texture analysis can be applied to a diverse range of situations. The inventors have demonstrated the application of the method to fertiliser pellets. Preliminary considerations indicate that it is also applicable to analysis of cervical cells on a Pap smear slide on a microscopic level and skin screening at a macroscopic level. Throughout the specification the aim has been to describe the preferred embodiments of the invention without limiting the invention to any one embodiment or specific collection of features.

What is claimed is:

1. A method of image texture analysis including the steps of:
   mapping the image into a first set of binary representations of the image, wherein each representation in the set corresponds to a transformation by a first monotonically varying operator;
   mapping each binary representation of the first set of binary representations into a further set of binary image representations using a second monotonically varying operator, thereby forming a matrix of binary image representations;
   transforming the matrix by allocating a scalar value to each binary image representation;
   arranging the scalar values in a two dimensional space against parameters of the first monotonically varying operator and the second monotonically varying operator to form a first array of scalar values; and
   identifying defined texture characteristics from the resulting array of scalar values.

2. The method of claim 1 wherein the first monotonically varying operator is a threshold operator.

3. The method of claim 2 wherein the threshold operator applies a threshold value that varies monotonically from a minimum value to a maximum value to produce the first set of binary representations.

4. The method of claim 1 wherein the second monotonically varying operator is a spatial operator.

5. The method of claim 4 wherein the spatial operator applies an opening that varies monotonically from a minimum value to a maximum value to produce the further set of binary representations for each representation in the first set of binary representations.

6. The method of claim 1 wherein the second monotonically varying operator is a morphological opening that removes all image objects below a defined size.

7. The method of claim 6 wherein the morphological opening is a set of disc shaped structuring elements of increasing radius.

8. The method of claim 1 further including the step of calculating a second array of scalar values derived from the first array of scalar values by taking at each point in the first array a minimum of a first difference in a first direction and a first difference in a second direction.

9. The method of claim 1 wherein the step of identifying defined texture characteristics includes the further step of comparing the first or second array of scalar values to a knowledge base of first or second arrays of scalar values known to indicate defined texture characteristics.

10. The method of claim 1 further including the step of calculating one or several texture feature values by computing linear sums of the values in the first or second arrays of scalar values.

11. An image texture analysis apparatus comprising:
    storage means for storing a digital representation of an image; processing means for:
       mapping the image into a first set of binary representations of the image, wherein each representation in the set corresponds to a transformation by a first monotonically varying operator;
       mapping each binary representation of the first set of binary representations into a further set of binary image representations using a second monotonically varying operator, thereby forming a matrix of binary image representations;
       transforming the matrix by allocating a scalar value to each binary image representation;
       arranging the scalar values in a two dimensional space against parameters of the first monotonically varying operator and the second monotonically varying operator to form a first array of scalar values; and
       identifying defined texture characteristics from the resulting first array of scalar values; and
    display means for displaying the first array of scalar values and
    identified texture characteristics.

12. The apparatus of claim 11 further including means for storing a knowledge database of first arrays of scalar values known to indicate defined texture characteristics and means for comparing the first array of scalar values with the knowledge database of first arrays of scalar values to identify defined texture characteristics.

* * * * *

UNITED STATES PATENT AND TRADEMARK OFFICE
CERTIFICATE OF CORRECTION

PATENT NO. : 6,882,748 B2
DATED : April 19, 2005
INVENTOR(S) : Jackway et al.

It is certified that error appears in the above-identified patent and that said Letters Patent is hereby corrected as shown below:

Column 8,
Line 45, delete "vie" and substitute therefor -- we --.

Signed and Sealed this

Twenty-ninth Day of November, 2005

JON W. DUDAS
*Director of the United States Patent and Trademark Office*